Jan. 27, 1970 MICHIAKA ITI 3,492,484

SPACE DIVISION MULTIPLEXED OPTICAL COMMUNICATION SYSTEM INCLUDING A PAIR OF LIGHT RESPONSIVE MATRICES

Filed Sept. 27, 1966 4 Sheets-Sheet 1

INVENTOR.
MICHIAKI ITO

BY

Hopgood & Calimafde
ATTORNEYS

Jan. 27, 1970 MICHIAKA ITI 3,492,484

SPACE DIVISION MULTIFLEXED OPTICAL COMMUNICATION SYSTEM
INCLUDING A PAIR OF LIGHT RESPONSIVE MATRICES

Filed Sept. 27, 1966 4 Sheets-Sheet 2

INVENTOR.
MICHIAKI ITO
BY
Hopgood & Calimafde
ATTORNEYS

INVENTOR.
MICHIAKI ITO
BY
Hopgood & Calimafde
ATTORNEYS

INVENTOR.
MICHIAKI ITO
BY
Hopgood & Calimafde
ATTORNEYS

United States Patent Office 3,492,484
Patented Jan. 27, 1970

3,492,484

SPACE DIVISION MULTIPLEXED OPTICAL COMMUNICATION SYSTEM INCLUDING A PAIR OF LIGHT RESPONSIVE MATRICES

Michiaki Ito, Tokyo, Japan (% Nippon Electric Co., Ltd., 7-15 Shiba Gochome, Minato-ku, Tokyo, Japan)

Filed Sept. 27, 1966, Ser. No. 582,359
Claims priority, application Japan, Dec. 15, 1965, 40/76,663
Int. Cl. H04b 9/00
U.S. Cl. 250—199 7 Claims

ABSTRACT OF THE DISCLOSURE

Light waves carrying signals are grouped in such a way that those signals associated with each of the groups may be caused to pass through a selected part of a receiving telescope system in common.

This invention relates to light communication systems, i.e., communication systems employing light waves as the principal medium of communication. More specifically, this invention relates to light communication systems suitable for the multiplex transmission of signals, whether the signals be audible or video or of other types.

Advances in the field of laser technology have made available extremely intense, sharply-focused, low-noise light beams which may be suitable for communicaton, for industrial purposes and for other purposes. These developments have stimulated keen interest in a light communication system which would achieve, in general, the same objectives and produce the same results as are available in conventional radio communication systems, especially if such a light communication system can be made practical and economical in the cost of the equipment and in the cost of rendering service over such a system. Moreover, such a system would be commercially even more attractive if it could handle a plurality of light channels simultaneously between two or more sites and it would be still more attractive commercially if it could handle large volumes of traffic.

In conventional radio communication systems operating, for example, in the microwave region, prevention of undesired radio interference between the multiplexed channels transmitted simultaneously over separate radio carrier waves has been attained essentially by severely defining the segments of the frequency spectrum occupied by the respective radio frequency bands upon which the signals have been modulated. In other words, the respective radio carrier bands of frequencies have been multiplexed on a frequency division basis. That is, the radio bands of frequencies were so arranged that the frequency components of each band did not overlap the frequency components of the bands transmitted simultaneously in the same general direction between the same or adjacent points.

In a conventional radio system operating, for example, in a pre-assigned region of the frequency spectrum, which is lower in the frequency spectrum than the range occupied by light waves, a carrier wave of a predetermined frequency can be readily generated with considerable exactitude and, with the aid of a specially designed antenna, the carrier wave may be given considerable directivity. However, due to the diffraction of the radio waves even from a highly directive antenna, there would inherently be some interference between communications traversing closely adjacent paths between two specified points. In the case of a light wave generated by a laser used as a carrier generator, the directivity of the waves can be much more sharply defined. Notwithstanding this fact, lasers have generated strong laser oscillations only at limited frequencies. For example, the helium-neon gas laser has generated strong laser oscillations at two wave lengths, 0.6328$\mu$ and 1.153$\mu$ and the argon laser has generated strong laser oscillations at several wave lengths, including 0.4880$\mu$ and 0.5145$\mu$. Consequently any scheme to make available laser wave lengths for communication service especially in densely populated areas should be arranged so as to permit those known available wave lengths to be used for many channels of communication in diverse directions. In view of the above it would be difficult and perhaps impossible to provide a light communication system for parallel transmission of different channels of signals on a frequency division basis.

It is therefore an object of the present invention to provide a light communication system in which the channels are economically and efficently multiplexed on a space division basis rather than on a frequency division basis.

In a communication system according to the present invention, light waves carrying signals are grouped in such a way that those signals associated with each of the groups may be caused to pass through a particular or selected part of a condenser system or of a receiving telescope system in common. Also, according to the present invention, a light communication system can be provided in which the space traversed by light waves is considerably saved by making common use of some considerable part of the light paths of the different groups.

The actual resolving power of a telescope horizontally installed on the ground for light waves depends mainly on the turbulence of the air and on the diffraction of such waves. The resolution power is affected to a greater extent by air turbulence than by diffraction. According to experimental results recently obtained, the fluctuation of the light paths due to turbulence in the atmosphere was observed to be about 0.0001 of a radian in a horizontal direction and about 2 to 3 ten thousandths of a radian in a vertical direction. By making the use of these observed properties of the fluctuations of light beams, light communication channels can arbitrarily be arranged to be in substantially parallel horizontal paths adjacent to each other. This can be achieved because the light waves transmitted in substantially parallel beams in the same general direction scarcely leak out of their elongated truncated elliptical horizontal cones, which have their vertices at the respective light transmitting sources. That is, the source of the light waves is in fact the axis common to the optical axis of the transmitting device. Similarly, the vertical angles of transmission must also take account of the above-mentioned deviation of the transmission direction of the light waves. In case the distance between the transmitter and the receiver is about several kilometers, for example, the bottom end surface of the elongated truncated elliptical cone at the receiving point will become less than 0.5 meter and 1 meter in horizontal and vertical directions, respectively.

In order to efficiently receive transmitted light waves, it is desirable that the effective aperture of the receiving telescope be approximately identical in its shape to the truncated elliptical cone, as observed at the receiver device. However, since the manufacturing cost of the receiving telescope usually increases in approximate proportion to the 3rd power of the above-mentioned aperture, a sufficiently large condenser system can not be provided for each channel due to these cost factors. Also, if a condenser system is to be installed for each of the unit devices at one site, the whole assembly of the receiving telescopes will become extremely bulky. In addition to the economic problem of the device itself, there might also be some deterioration in the appearance of a city which is supplied with considerable numbers of such arrangements.

In the system according to the present invention, the above-mentioned defect can be obviated by use of a single telescope of wide aperture at a receiving point for the simultaneous reception of a number of light beams. This may be accomplished by causing the light beams from the contiguous transmitters to pass through the common telescope and to be focused on corresponding light detectors associated with such telescope. This is fully realizable by virtue of the resolving power of the receiving telescope. Hence a single receiving telescope may be used in common for many different channels. Also, a number of such systems can be interleaved according to the present invention. If a number of transmitted light beams are positioned so closely that the receiving telescope can not resolve the several light beams, then each of the light beams associated with different groups may be directed to its own individual receiving telescope and, by virtue of the directivity of its associated collimator, the light beam directed to such telescope will not reach any other receiving telescope. Therefore, a single receiving telescope does not receive two unresolvable light beams simultaneously. By suitably interspersing the receiving telescopes and collimators in predetermined patterns or locations with respect to the different groups of signals, as will be described later, a sufficient number of light communication channels can be adequately handled within a rather small space occupied by the equipment as a whole.

The invention will be better understood from the following description when considered with reference to the accompanying drawings, in which.

Figure 1:
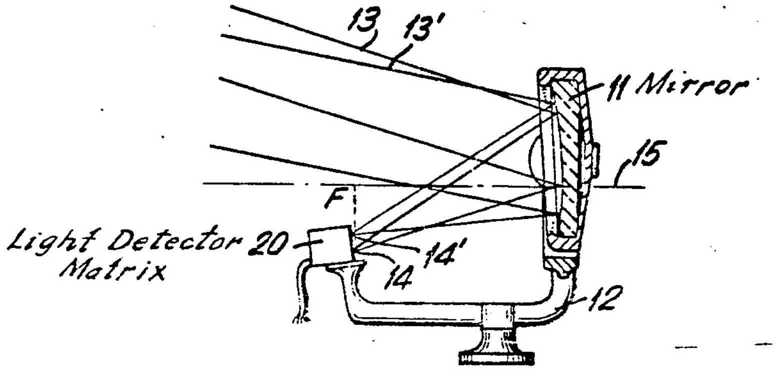
FIG. 1 shows, partly in section, a side view of a receiving telescope of a communication system according to the present invention.

Referring to FIG. 1, there is shown a reflecting telescope which may be used as a receiving means in a light communication system. The reflecting telescope includes a concave mirror 11 having a focal length $f$, this mirror being supported at one end of a supporting means 12 so as to be pointed in an arbitrary or predetermined direction from which light signals will be received. A light detector matrix 20 is shown supported at the opposite end of the supporting means 12, with the light-receiving surface of the matrix 20 being positioned substantially at the focal plane of the mirror 11.

A light beam generally defined by line 13 falling upon the mirror 11 is so directed as to produce an optical image generally defined by line 14 on the light-receiving surface of the matrix 20. The image 14 may be confined within a distance $f\theta_0$ from the optical axis 15 of the mirror 11, and within the diameter $f\theta_1$ on the focal plane of mirror 11, where the average angle formed between the light beam 13 and the optical axis 15 is defined as $\theta_0$ and the average of fluctuation angle as $\theta_1$. As has been mentioned above, the average fluctuation angle $\theta_1$ is about 1 to $3\times10^{-4}$ radians, an angle which is far greater than the limit, $0.61\times$(wave length)/(radius of a mirror), determined by the diffraction phenomena and which does not become appreciably greater than the spherical aberration of the reflex mirror even if the value of $\theta_0$ is made large. Therefore, by making the angle formed between the adjacent two light sources greater than $2\theta_1$, two different images 14 and 14' can clearly be distinguished and separated on the receiving surface of the matrix 20. There will then be no interference between the signals borne by beam 14 and those signals borne by beam 14'.

Figure 2:
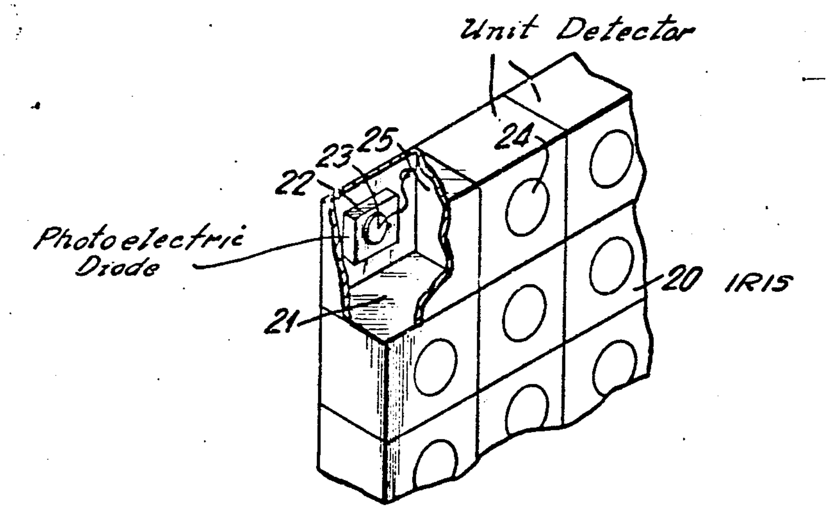
FIG. 2 shows schematically a perspective view of a light detector for a device such as in FIG. 1.

Referring to FIG. 2, there is shown an enlarged perspective view of an example of the light detector matrix 20 of FIG. 1. The FIG. 2 arrangement would include a plurality of unit detectors, such as 21, arranged in matrix form, only one of which is shown cut away so as to illustrate more clearly the internal structure thereof. Each of the unit detectors of the matrix contains a so-called photo-electric diode 22 having a p-n junction or a p-i-n junction of semiconductors, whose photosensitive surface 23 receives the light beam having passed through a view iris such as 24 provided at the front face. The reflected or scattered light component, which has not been absorbed by the photosensitive surface 23, is preferably absorbed by the internal wall structure of a housing 25. Hence the light component transmitted to the unit detector 21 will not leak out of the housing 25 of the unit detector 21.The housing 25 may be made of a metal plate, for example, for effectively separating the diode 23 from all adjacent corresponding diodes of the matrix, the separation to be accomplished not only optically but also electrically.

In view of the foregoing disclosures of FIGS. 1 and 2, it will be understood that, according to the principle of the present invention, light beams transmitted from transmitters located in the slightly divergent directions can be received by means of a matrix of a single telescope to produce or re-transmit a plurality of signals associated with and corresponding to different communication channels, such signals to be subsequently detected or demodulated.

Figure 3:
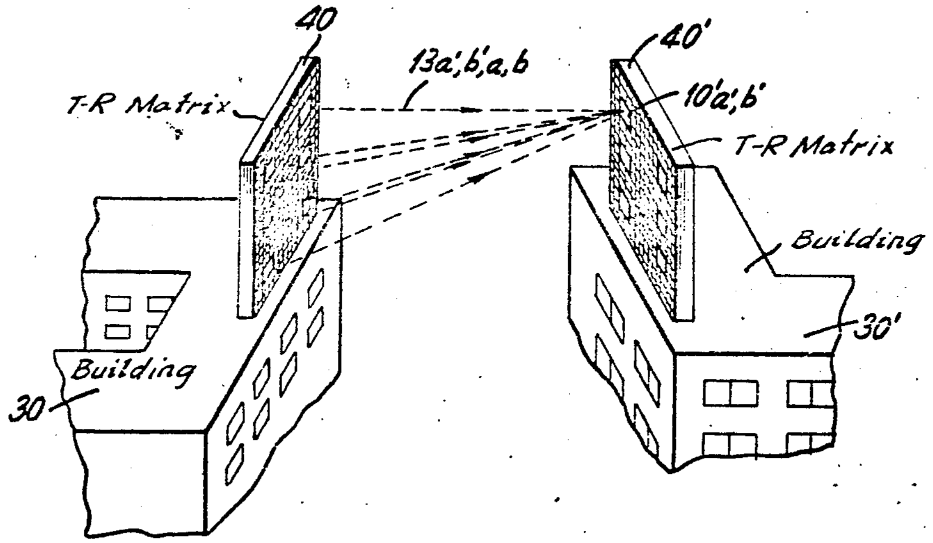
FIG. 3 shows an example of a two-unit system which may be constructed according to the present invention.

In FIG. 3, there is shown an example of a larger scale light communication system depicted to further illustrate the above-mentioned principle. Transmitter-receiver matrices 40 and 40' may be respectively installed, for example, on the roofs of buildings 30 and 30'. The buildings 30 and 30' were preferably selected because they face each other a few kilometers apart. Communications are carried out by coupling these matrices with each other via the many and varied groups of light beams 13 (six of which are illustratively shown by dotted lines).

Figure 5:
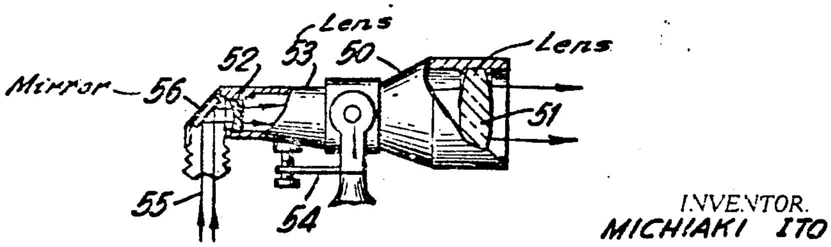
FIG. 5 shows an example of the collimator for a transmitter which may be used in the transmitter-receiver matrix of FIG. 4.
Figure 4:
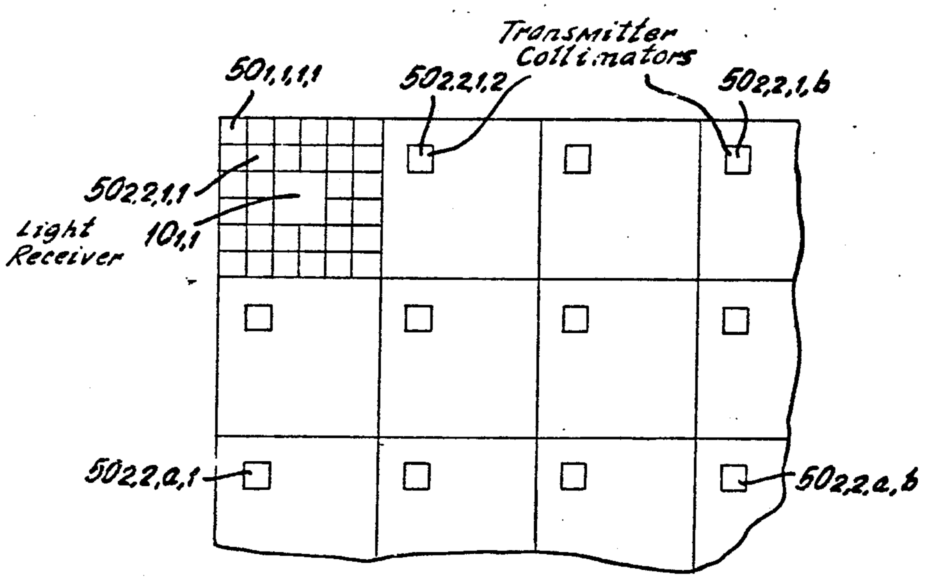
FIG. 4 shows schematically an arrangement of the light transmitter-receiver matrix to be used in a system such as that shown in FIG. 3.

Referring to FIG. 4, there are shown a plurality of rectangles as an example of the arrangement of the light receivers generally designated $10_{a,b}$, each of which is similar to the one shown in FIG. 1, and a plurality of transmitter collimators generally designated $50_{a'b',a,b}$ to be explained in more detail in reference to FIG. 5. The transmitter-receiver matrix 40 may have $m\times n$ unit matrices ($m$ and $n$ in vertical and horizontal directions, respectively) and each matrix may have $m\times n$ transmitter collimators $50_{a',b',a,b}$ adjacent to and surrounding the light receivers $10_{a,b}$. Both $m$ and $n$ are arbitrary integers, and $a'=1,2,\ldots m'$; $b'=1,2,\ldots n$.

Referring to FIG. 5, the transmitter collimator 50 is composed of a telescope of the Galilean type which comprises: a converging lens or lenses 51; a diverging lens or lenses 52; a cylinder 53 for supporting said lenses and for preventing undesired external light rays from entering the enclosure or from interfering with the transmitted rays; and supporting means 54 having a direction-adjusting mechanism for supporting the above-mentioned elements and for pointing the optical axis of the telescope in any arbitrary or predetermined direction. The signal light beam 55, for example, emitted from a light source, such as a laser having a light modulator (not shown), is made to be correctly incident onto the collimator 50 by means of an angular plane mirror 56 and is transmitted to a light receiver of a remote communication station by adjusting the direction and the spread of the beam for its optimum effect.

Referring back again to FIG. 4, the light beams emitted from the transmitter collimators $50_{1,1,a,b}$, $50_{1,2,a,b}$, . . . $50_{1,m,a,b}$, $50_{2,1,a,b}$ . . . $50_{2,n,a,b}$, . . . $50_{a',b',a,b}$, . . . $50_{n,1,a,b}$ . . . $50_{n,m,a,b}$, etc. are arranged around a light receiver $10_{a,b}$, for example, of the matrix 40, and such beams are directed to light receivers $10'_{1,1}$, $10'_{1,2}$, . . . $10'_{1,m}$, $10'_{2,1}$, . . . $10'_{2,n}$, . . . $10'_{a',b'}$, . . . $10'_{n,1}$, . . . $10'_{n,m}$, etc., which may be included in the transmitter-receiver matrix 40'. By making the space interval of each light receiver $10'_{a',b'}$ of the matrix 40' greater than the value that would correspond to the above-mentioned deviation angle (viewed at matrix 40) of $1\times10^{-4}$ radians in a horizontal direction, and of $3\times10^{-4}$ radians in a vertical direction, then the light beams transmitted from the different transmitter collimators will not be incident upon the same photo detector. This will eliminate interference as already explained.

Each of the light receivers $10'_{a',b'}$ in the matrix 40' may receive $m\times n$ light beams $13_{a',b',a,b}$, each of which is transmitted from a different sub-matrix which includes, for example, $m\times n$ collimators $50_{a',b',a,b}$ and an appropriate number of light receivers $10_{a,b}$. With an arrangement of submatrices which are made identical to each other, the mutually equal space intervals can be made greater than that determined by the resolving power of the receiving telescopes. Hence the light beams transmitted from the transmitter collimator $50_{a',b',a,b}$ can be separately projected, as inverted real images of the submatrix of the matrix 40, on the focal plane of the light receiver $10'_{a',b'}$. As shown in FIG. 2, the plane of the detector matrix 20 is mounted so as to produce electrical signals associated with a number of different channels. As a matter of fact, as the diameter of the aperture of a receiving telescope $10_{a,b}$ is made far larger than the diameter of a transmitter collimator 50, and as the front surfaces of the transmitter-receiver matrices 40 and 40' are made a little larger than $m\times n$ times the size of a light receiver $10_{a,b}$, the number of separate channels provided by the matrices can be made $(m\times n)^2$ times as many as the case of a conventional system. In other words, the space occupied by each channel is reduced to $1/(m\times n)$. More particularly, a matrix, which is, for example, six and eight meters in each dimensions, can accommodate about 2500 light communication channels.

Although the preceding explanation has been given with respect to a light communication channel formed between two confronting transmitter-receiver matrices 40 and 40' such as is shown in FIG. 3, it will be understood that any other light beams emitted from matrices other than the matrix 40', for example, may be directed to a light receiver $10_{a,b}$ of the matrix 40. This improves the overall beam receptivity and the capability of the system.

In order to facilitate an understanding of a more complicated arrangement of the matrices, a diagram of the channel arrangement will now be described.

Figure 6:
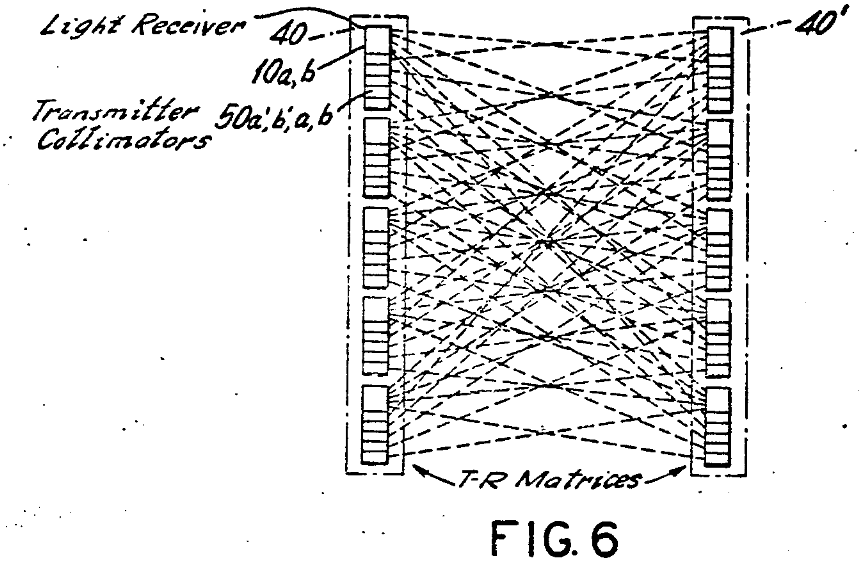
FIG. 6 is a schematic diagram showing a feasible general channel arrangement of an embodiment such as that of FIG. 3.

Referring to FIG. 6, there is shown a channel diagram which may be associated with and related to the embodiments of FIGS. 3 and 4. Here the general plan of the matrix is converted to a sort of side view arrangement. In that arrangement the several subgroups, each composed of a light receiver, such as $10_{ab}$, and a group of the transmitter collimators, such as $50_{ab'ab}$, positioned around said light receiver (all of which are shown as rectangles), form two transmitter-receiver matrices 40 and 40' (each of which is enclosed by a dot-and-dash line). The dotted lines between the two matrices 40 and 40' show the light communication channels formed between the various light receivers and the various transmitters. Each dotted line necessarily indicates a communication channel extending from a transmitter of one of the matrices 40, for example, to a receiver of the other of the matrices 40', and vice versa. No further transmission or reception channel data is required to explain the communication features of the FIG. 6 arrangement.

Figure 7:
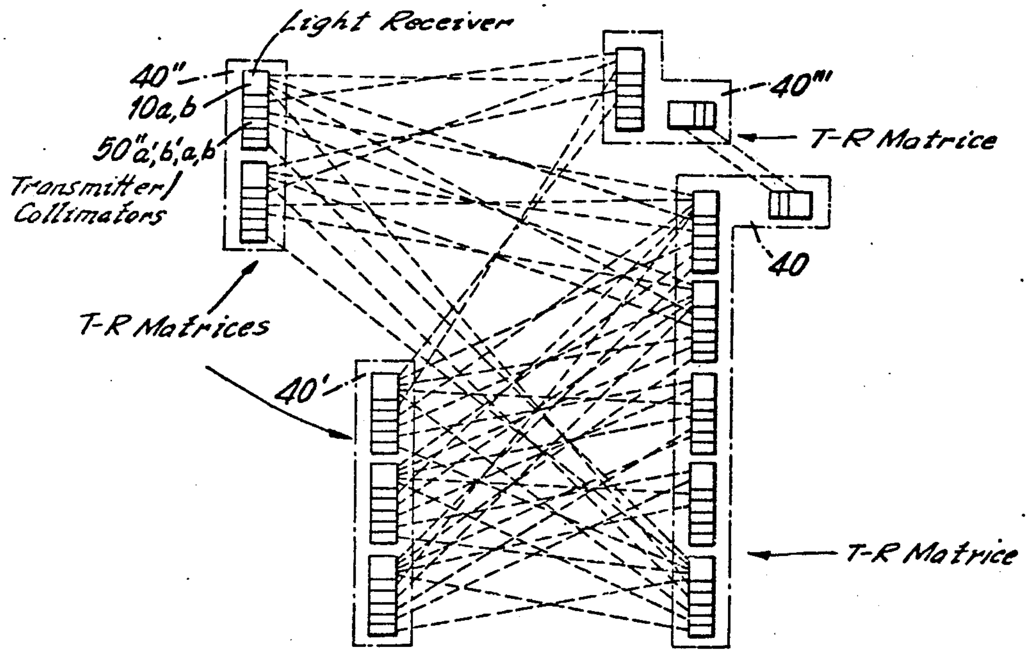
FIG. 7 is a schematic diagram showing a form of channel arrangement for a more generalized embodiment of transmitter-receiver matrices of the present invention.

FIG. 7 shows an example of a network of four separate transmitting and receiving sites for relating four matrices 40, 40', 40'' and 40''' to each other for cooperative light transmission and reception service. Each light receiver is adapted to receive the light beams transmitted from the different transmitter-receiver matrices disposed at any or all of the different sites. Needless to say, it would become impossible to use a particular light receiver in common with a plurality of transmitter collimators in the event that the directions of the light waves of such transmitter collimators deviated from each other by more than certain predetermined angles as above noted. Only those beams which are maintained within their assigned angularities will be impressed on and be detected by a predetermined light receiver. It will be easily understood, however, that this criterion does not diminish the technical advantage of the present invention. Indeed this factor serves to obviate undesired or interfering wave formations.

It should be noted that many kinds of physical and electrical modifications may obviously be made as to the embodiments of the present invention.

The physical dimensions of the detector 20 may be standardized by suitably choosing its focal length $f$. This is because the size or magnitude of an optical image as it appears on the focal plane of a typical light receiver $10_{a,b}$ is proportional to the focal length $f$ of the concave mirror 11 associated with the same detector 20 (see FIG. 1). Moreover, in order to cause the area of the light receiving surface to coincide with the desired magnitude of the image, another converging optical system may be added to the detector 20 to accomplish this purpose. This would be apparent, of course, to those skilled in the art.

Figure 8:
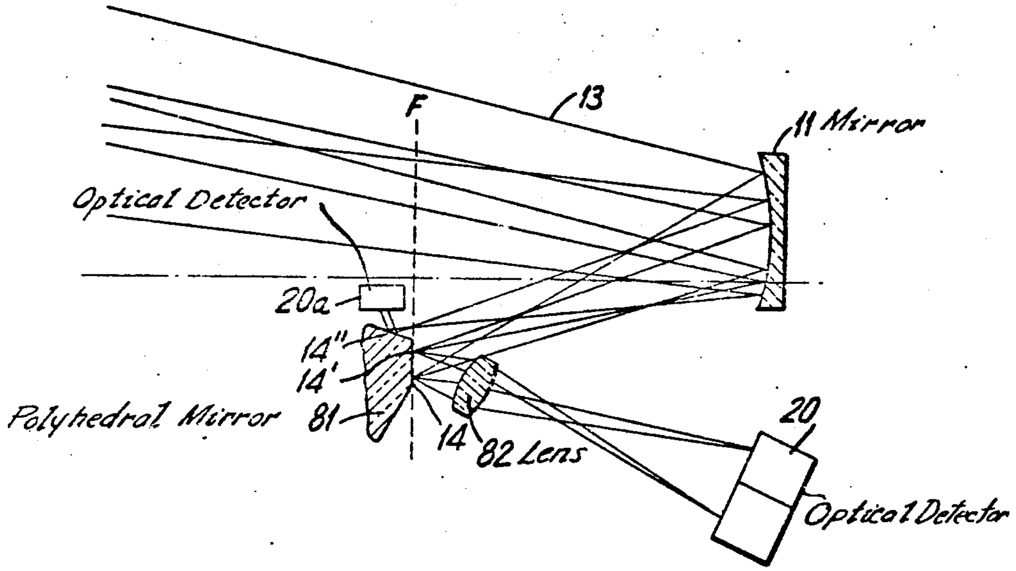
FIGS. 8 and 9 show modifications of light receivers of the general type shown in FIG. 2.

FIG. 8 shows an example of an optical system which may be used for the latter purpose. Here an intermediate polyhedral mirror 81 is disposed at the focal plane of the mirror 11. Optical images 14, 14' and 14'', readily traced as corresponding to received light channels, are separately reflected by the reflective surfaces of the polyhedral mirror 81. Two of these reflected images, 14 and 14', are then projected toward the optical detector 20 for receiving those images. Another optical detector 20a obviously may be employed to receive the optical image 14''. Any optical detector of large dimensions, for example, a photo-electron multiplier having high sensitivity, may be used here as a photo detector. In case the images are small in number and relatively close to each other, the polyhedral mirror 81 may be dispensed with, since the polyhedral mirror structure was added to the combination merely to reduce the visual field of each of the converging lenses 82.

The combination of a separately constructed p-n junction diode may obviously be used as the detector 20. Such a diode may be mass-produced from a single wafer by applying photo-etching techniques well known to those skilled in this art.

Figure 9:
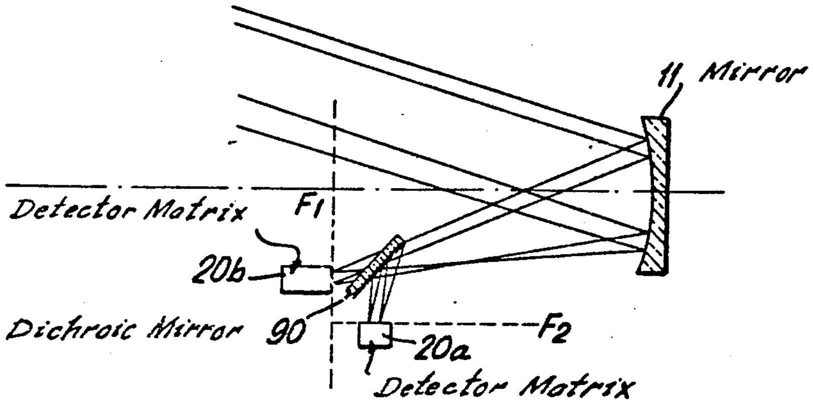

Although it may have been assumed from the preceding description that the light waves have identical wave lengths, this is not essential. The light waves may have mutually different wave lengths. In such a case, a dichroic mirror 90 having a multi-layer film of dielectric material may be employed, as shown in FIG. 9, between the concave mirror 11 and its focal plane. Inasmuch as the multi-layer film of the mirror 90 will provide selectivity for the several wave lengths, the optical images may be separately produced on two different detector matrices 20a and 20b, each image to correspond to the wave length of the incident light beam.

Since a single light receiver can be used, as is mentioned above, as a common component for a number of different channels according to the present system, it is possible not only to remarkably reduce the cost of the equipment per channel of the light receiver and the cost of rendering communication service per channel, but also to provide an extremely large number of light communication channels with relatively small devices occupying a small space. Therefore, the economical advantage brought about by this invention is considerable.

Thus, the light communication arrangement of this invention is suitable for crowding a multiplicity of channels into a relatively small space with high precision and this is accomplished at a relatively small overall cost for the equipment. These features, brought about in part by the coherent light beams generated by laser equipment, render the communication system entirely free of frequency division techniques. By employing appropriate reflecting mirror devices, space division for communication channels is effected. The beams may be in the invisible light range and may, therefore, be employed for secrecy and like purposes.

While this invention has been shown and described in certain particular embodiments merely for the purpose of illustration, it will be clearly understood that the general features of this invention may be applied to other and widely varied organizations without departing from the spirit of the invention and the scope of the appended claims.

What is claimed is:

1. A space division multiplexed optical communication system comprising,
- means providing a first matrix of coherent information-modulatable light beam sources spaced from each other in a first plane with selected ones of said beams in the matrix angularly oriented relative to the first plane to direct said light beams at a first common reception area distant from said plane,
- means providing a first matrix of light-responsive receiving devices each having a second common reception area, with said receiving devices selectively arranged within the first matrix with the second common reception areas distributed and spaced from one another substantially within the first plane and facing said first common area distant from the plane,
- means providing a second matrix of coherent modulatable light beam sources selectively spaced from each other in a second plane substantially coplanar with the first common area, with selected ones of said beams in the second matrix angularly oriented relative to the second plane to direct said second light beams at said second common reception areas,
- means providing a second matrix of light-responsive receiving devices each having a first common reception area, with said receiving devices arranged within the second matrix, with the first common reception areas distributed and spaced from one another substantially within the second plane,
- each of said receiving devices separating said beams incident upon its common reception area for demodulation thereof, and
- with the spacing within respective matrices of said beams incident upon a common reception area being chosen to provide respective beam angles differing from one another by a preselected minimum value.

2. The device as recited in claim 1 wherein said spacing is selected commensurate with the distance between the common area and the plane.

3. The device as recited in claim 2 wherein said minimum beam angle difference is selected commensurate with a preselected multiple of the inherent divergence of said respective beams.

4. The device as recited in claim 3 wherein said minimum beam angle is selected of the order of twice the angle of .0006 radian.

5. The device as recited in claim 1 and further comprising,
- a plurality of photon-responsive converters disposed to respond to said separated light beams to provide electrical signals indicative of the modulation information in said respective beams.

6. The device as recited in claim 1 wherein said light beam separating means includes,
- an optical system converging the light incident upon the common area onto a focal plane with said beams effectively separated from one another within the focal plane, and
- a plurality of photo-electric devices disposed within the focal plane to provide a plurality of electrical signals representative of the information modulated on said beams.

7. The device as recited in claim 6 wherein said coherent light beam sources further each include
- an optical telescope having an optical axis, an input and an output,
- said input responsive to the modulated light from a coherent light beam and the optical output axis aligned to direct a collimated light beam at said common area.

References Cited

UNITED STATES PATENTS

| | | | |
|---|---|---|---|
| 1,984,673 | 12/1934 | Du Mont | 178—6 |
| 2,530,580 | 11/1950 | Lindenblad | 250—199 |
| 2,100,348 | 11/1937 | Nicolson | 250—199 |
| 3,275,746 | 9/1966 | Beltrami. | |

FOREIGN PATENTS

| | | |
|---|---|---|
| 1,022,323 | 3/1966 | England. |

RICHARD MURRAY, Primary Examiner

A. J. MAYER, Assistant Examiner

UNITED STATES PATENT OFFICE
CERTIFICATE OF CORRECTION

Patent No. 3,492,484 January 27, 1970

Michiaki Ito

It is certified that error appears in the above identified patent and that said Letters Patent are hereby corrected as shown below:

In the heading to the drawings "MICHIAKI ITI" , each occurrence, should read -- MICHIAKI ITO --.

Signed and sealed this 10th day of November 1970.

(SEAL)
Attest:

Edward M. Fletcher, Jr.
Attesting Officer

WILLIAM E. SCHUYLER, JR.
Commissioner of Patents